(12) United States Patent
Neuman et al.

(10) Patent No.: US 8,185,600 B2
(45) Date of Patent: *May 22, 2012

(54) PROGRAMMING SYSTEM AND METHOD FOR A VIDEO NETWORK

(75) Inventors: Darren Neuman, San Jose, CA (US); Jason Herrick, Newark, CA (US)

(73) Assignee: Broadcom Corporation, Irvine, CA (US)

(*) Notice: Subject to any disclaimer, the term of this patent is extended or adjusted under 35 U.S.C. 154(b) by 1465 days.

This patent is subject to a terminal disclaimer.

(21) Appl. No.: 11/015,443

(22) Filed: Dec. 17, 2004

(65) Prior Publication Data

US 2005/0154801 A1 Jul. 14, 2005

Related U.S. Application Data

(60) Provisional application No. 60/532,959, filed on Dec. 29, 2003.

(51) Int. Cl.
*G06F 15/167* (2006.01)
(52) U.S. Cl. ......... 709/212; 709/220; 710/107; 718/108
(58) Field of Classification Search .................. 709/205, 709/201–203, 208, 211, 212, 246, 220; 718/108; 710/107
See application file for complete search history.

(56) References Cited

U.S. PATENT DOCUMENTS

| | | | | |
|---|---|---|---|---|
| 5,659,749 A * | 8/1997 | Mitchell et al. | ............... | 718/108 |
| 5,905,912 A * | 5/1999 | Story et al. | ...................... | 710/27 |
| 5,960,006 A * | 9/1999 | Maturi et al. | ................. | 370/509 |
| 6,020,901 A * | 2/2000 | Lavelle et al. | ................ | 345/545 |
| 6,298,405 B1 * | 10/2001 | Ito et al. | ........................ | 710/107 |
| 6,748,020 B1 * | 6/2004 | Eifrig et al. | ............. | 375/240.26 |
| 2003/0118053 A1 * | 6/2003 | Edsall et al. | .................. | 370/474 |

* cited by examiner

*Primary Examiner* — Tammy Nguyen
(74) *Attorney, Agent, or Firm* — Thomas, Kayden, Horstemeyer & Risley, LLP (57) ABSTRACT

In a signal processing system, a programming system and method for a video network are provided. An event may trigger an RDMA controller to execute current instructions in a register update list. The triggering event may be a start-of-field signal from a live source or an end-of-frame signal. The current instructions may be used to modify the mode of operation of at least one of the network elements in the video network. The modification to the mode of operation may depend on whether the current video field is top field originated or bottom field originated. An interrupt may be used to initiate an interrupt handler that generates at least one new instruction and that updates the new instructions in the register update list. When a trigger occurs prior to an update of the register update list, the RDMA controller may execute the current instructions in the register update list.

15 Claims, 5 Drawing Sheets

PROGRAMMING SYSTEM AND METHOD FOR A VIDEO NETWORK

CROSS-REFERENCE TO RELATED APPLICATIONS/INCORPORATION BY REFERENCE

This patent application makes reference to, claims priority to and claims benefit from U.S. Provisional Patent Application Ser. No. 60/532,959, entitled "MPEG Field Data-Driven Display," filed on Dec. 29, 2003.

FIELD OF THE INVENTION

Certain embodiments of the invention relate to the processing of video signals. More specifically, certain embodiments of the invention relate to a programming system and method for a video network.

BACKGROUND OF THE INVENTION

Video systems may be used to provide data processing operations when video information is to be transmitted or displayed. These processing operations may comprise the encoding and decoding of video data into a plurality of video formats or video standards. The video data to be processed by the video system may come from a plurality of video sources and the processed video data may be transmitted, stored, and/or displayed into a plurality of devices and/or systems. To realize the encoding, decoding, and possibly other application specific data processing operations, video systems may comprise a plurality of network elements or network modules that provide the desired processing capabilities with sufficient flexibility.

Modifying the mode of operation or functional performance of the network elements in a video system based upon the occurrence of a processing or operating event, may have to be carried out without affecting the current state information of the network element or without affecting current video data information in the network element. This approach would ensure that visually pleasing video data is maintained during the transition between modes of operation. However, maintaining a large number of state variables and/or video data information in each of the network elements may prove very complex to implement and manage and this complexity may limit the ability of network elements to modify or change their modes of operation. Moreover, providing significant local storage in each of the network elements may increase design area and may result in added cost. The complexity of video data processing operations, which may require a coordinated modification of the mode of operation in a plurality of network elements during the video network's operation, may prove to be extremely difficult to implement using a software-only programming and control sequence.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for video signal processing. Aspects of the method may comprise triggering the execution of at least one current instruction from a register update list upon the occurrence of a hardware event, modifying a mode of operation of at least one of a plurality of network elements based on the triggered current instructions, and updating new instructions in the register update list. Another aspect of the method may comprise triggering the execution of current instructions when a start-of-field or an end-of-frame signal is received. Modification of the operation of the network elements may depend on whether a video field is a top field originated video field or a bottom field originated video field.

An interrupt may be generated after the execution of the current instructions to initiate an interrupt handler that generates new instructions and updates the register update list with the generated new instructions. The current instructions may be used when a triggering signal is received before the interrupt handler completes generating the new instructions or before the interrupt handler updates the new instructions in the register update list.

Another embodiment of the invention may provide a machine-readable storage, having stored thereon, a computer program having at least one code section executable by a machine, thereby causing the machine to perform the steps as described above for video signal processing.

Aspects of the system may comprise at least one network element that triggers the execution of at least one current instruction from the register update list in a memory, an RDMA controller that modifies the mode of operation of at least one of the network elements based on the triggered current instructions, and at least one processor that updates new instructions in the register update list. Another aspect of the system may comprise the network elements triggering the execution of the current instructions when a start-of-field or an end-of-frame signal is received. Modifications to the operation of the network elements may depend on whether a video field is a top field originated video field or a bottom field originated video field.

The RDMA controller may generate an interrupt after the execution of the current instructions to initiate an interrupt handler that generates new instructions and updates the register update list in memory with the generated new instructions. The current instructions may be used by the RDMA controller when a triggering signal is received before the interrupt handler completes generating the new instructions or before the interrupt handler updates the new instructions in the register update list. The interrupt handler may be executed by the processor.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a programming system and method for a video network. Greater flexibility in the modification and programming of the mode of operation of a network element may be achieved by minimal increases in hardware while also providing a simpler interface for a system software to control state information. The simpler interface may specify the modifications required to the function or operation of the network elements for the next video field or video frame. These modifications may be triggered by the occurrence of a hardware event and may depend on the source of the video data. This approach for a programming and control sequence of the video network may also ensure that visually pleasing video outputs are maintained during operation or functional transitions in the video system.

Figure 1:
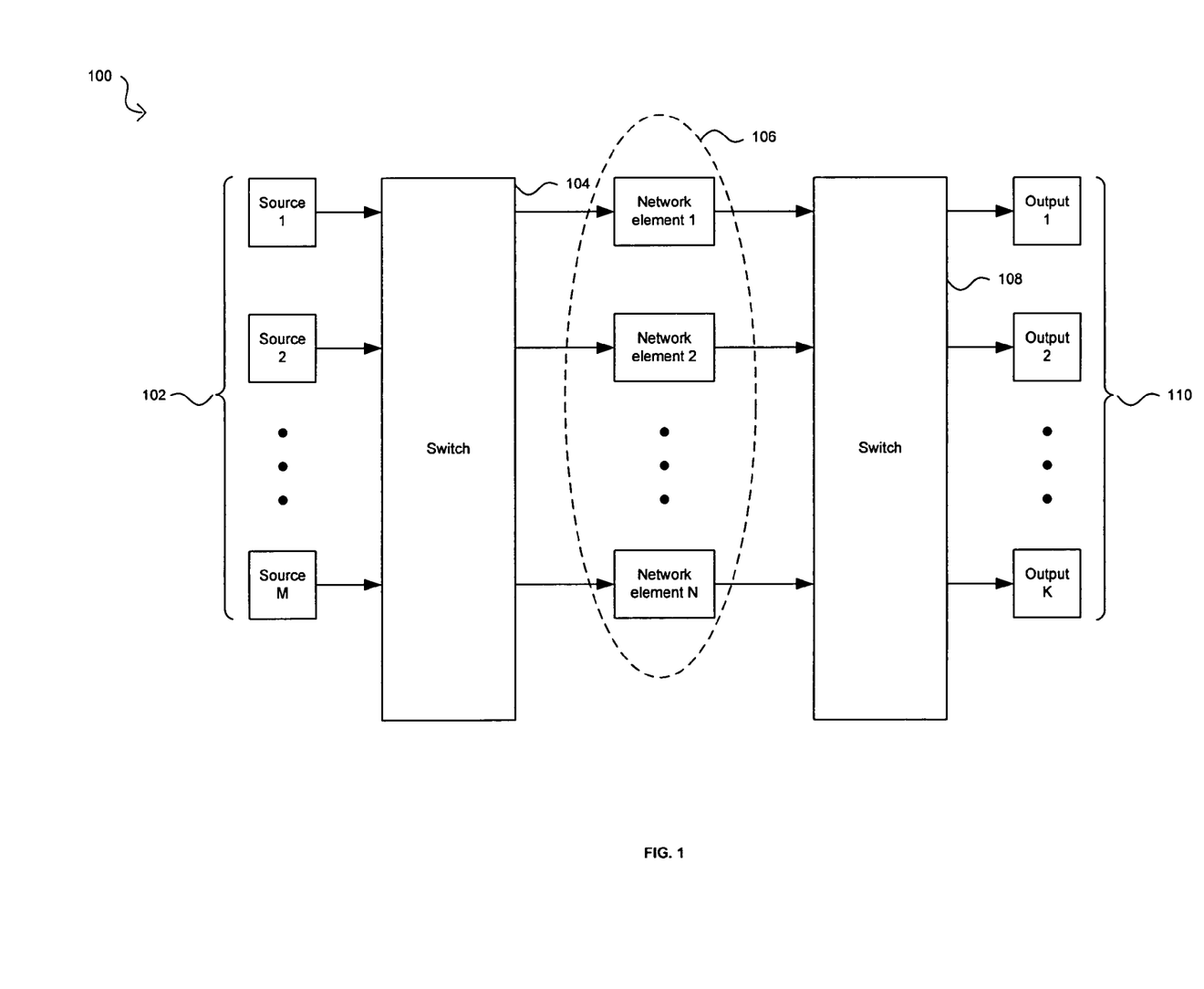
FIG. 1 illustrates a block diagram of an exemplary video network with multiple network elements, in accordance with an embodiment of the present invention.

FIG. 1 illustrates a block diagram of an exemplary video network with multiple network elements, in accordance with an embodiment of the present invention. The exemplary video network 100 may comprise a plurality of sources 102, switches 104, 108, a plurality of network elements 106, and a plurality of outputs 110 for transmission, storage and/or display of processed video data. The sources 102 may comprise, for example, live video sources, video feeders, high definition digital visual interfaces, and/or video decoders (VDECs). The plurality of network elements 106 may comprise, for example, scalers, upscalers, decoders, encoders, compositors, deinterlacers, and other application specific data processing blocks. The switches 104, 106 may be used to provide connectivity between the plurality of sources 102, the plurality of network elements 106, and the plurality of outputs 110. For example, switches 104, 106 may provide a video network configuration where a source 1 provides the video data to be processed by a network element 2 and the processed video data is then sent to an output K. Other possible architectures may be provided where multiple switches may be used to allow more flexibility in the connection of the plurality of network elements 106 and where feedback paths may also be implemented. The plurality of outputs 110 may comprise checksum blocks that verify the validity of the video data, capture blocks which may be used for storage or display, and video encoders which may be used to modify the video data in order to transmit, store, and/or display it in a specified format.

During operation, each of the plurality of network elements 106 may have to maintain a large number of state variables or video data information in order to carry out a particular mode of operation or data processing function. The mode of operation or function being performed by a network element may be modified during operation because, for example, video frames or video fields being processed by the video network 100 may be out of sequence or because the video format being requested from the video network 100 may be regularly updated. For example, in the case where video data is received for display in interlaced video format instead of progressive video format, some network elements may have the added task of managing state variables and/or video data information to indicate whether the video field being processed is a top originated or bottom originated video field. Other functions may require that at least one prior video field or video frame be stored in order to carry out data transmission or display operations. For example, a video system that uses a reference frame for prediction encoding may transmit the reference frame in a different order from its display order, requiring some form of local buffering for the reference frame in addition to an administrative function that tracks changes in the mode of operation when the network element encodes and/or transfers the video data sequences.

Figure 2:
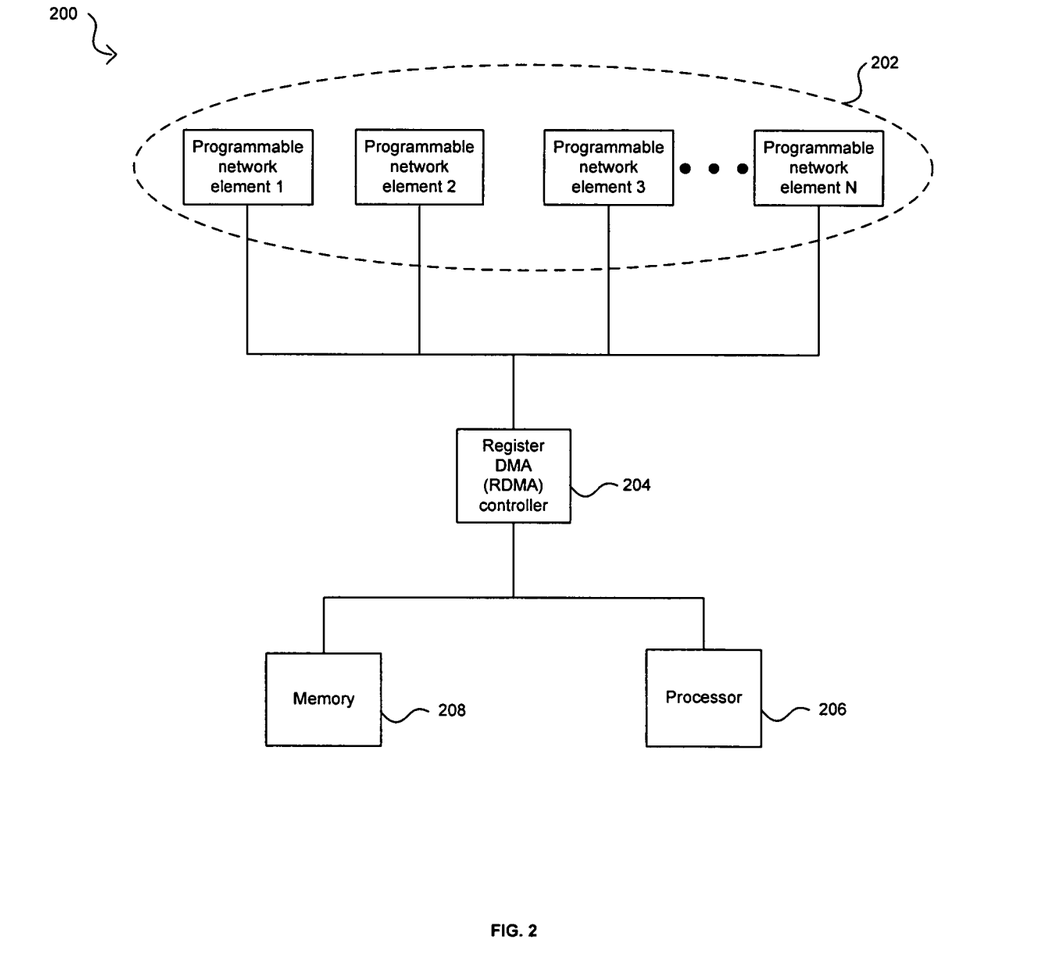
FIG. 2 illustrates a block diagram of an exemplary programming and control system for programmable network elements in a video network, in accordance with an embodiment of the present invention.

FIG. 2 illustrates a block diagram of an exemplary programming and control system for programmable network elements in a video network, in accordance with an embodiment of the present invention. Referring to FIG. 2, the programming and control system 200 may comprise a plurality of programmable network elements 202, a register direct memory access (RDMA) controller 204, a processor 206, and a memory 208. The programmable network elements 202 may comprise suitable logic, circuitry, and/or code and may be adapted to provide video data processing functions. The video data processing functions may be programmed or modified during operation on a field-by-field basis or on a frame-by-frame basis. The RDMA controller 204 may comprise suitable logic, circuitry, and/or code and may be adapted to transfer data directly to or from a register memory without the need to involve the processor 206. The register memory accessed by the RDMA controller 204 may be a register update list (RUL) which may be used to modify or program the modes of operation of the programmable network elements 202. The RUL may comprise a plurality of registers which may contain instructions as to the modes of operations or video data processing functions that each of the programmable network elements 202 may carry out on a video field or a video frame. The processor 204 may comprise suitable logic, circuitry, and/or code and may be adapted to execute system software that may be used to modify the contents of the RUL in the memory 206. The memory 206 may comprise suitable logic, circuitry, and/or code and may be adapted to store the RUL to be used by the RDMA controller 204 and may also store video data information to be utilized by the programmable network elements 202.

Figure 3:
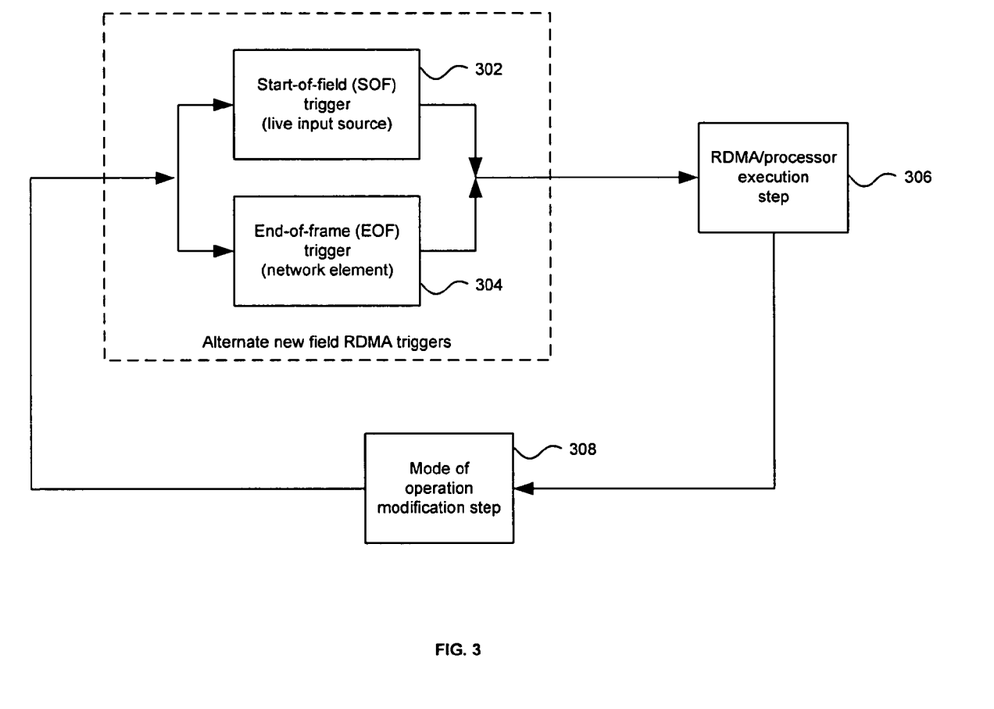
FIG. 3 illustrates exemplary triggering events that may be utilized to initiate a network element programming sequence, in accordance with an embodiment of the invention.

FIG. 3 illustrates exemplary triggering events that may be utilized to initiate a network element programming sequence, in accordance with an embodiment of the invention. Referring to FIG. 3, the exemplary network element programming sequence shown is based on a field-by-field triggering that initiates the programming or modification of the modes of operation in at least one of the programmable network elements 202 in FIG. 2. Other exemplary network element programming sequences may be based on frame-by-frame triggering or on a mechanism that may provide for hardware events that may produce triggering signals based on a combination of field and frame information. In this exemplary network element programming sequence, there may be two possible hardware events or mechanisms that may provide a trigger that produces the programming or modification to the mode of operation in a network element: a start-of-field (SOF) trigger signal 302 may be received from a live video source or an end-of-frame (EOF) trigger signal 304 may be received from at least one of the plurality of programmable network elements 202 in FIG. 2. For example, the end-of-frame (EOF) trigger signal 304 may be received from a last of the plurality of programmable network elements 202.

The operation in an RDMA controller/processor execution step 306 may be initiated, for example, after the SOF trigger signal 302 is received by the RDMA controller 204. This execution step may be used to execute the current instructions in the RUL and to determine new instructions to be performed in the modified modes of operation in the programmable network elements 202 during the next video field. For example, when a live video source provides a top originated video field trigger signal, then the RDMA controller 204 executes a current set of top originated video field instructions in the RUL. These instructions correspond to the current state or mode of operation for the programmable network elements. When the live video source provides a bottom originated video field trigger signal, then the RDMA controller 204 executes a set of bottom originated video field instructions in the RUL.

When the triggering mechanism that initiates the RDMA controller/processor execution step 306 is a video feeder, as is the case with an EOF trigger signal 304, the programmable network element 202 that is at the end of the video network may provide a top originated video field trigger signal or a bottom originated video field trigger signal to get the corresponding set of instructions in the RUL to execute.

Whether the triggering mechanism is an SOF trigger signal 302 or an EOF trigger signal 304, the mode of operation modification step 308 may provide new instructions for the programmable network elements to use for the next video field to be processed and the modification may be initiated after the trigger signal is received and the current instructions in the RUL are executed. An example of network element modification or programming may comprise the instructional changes that may take place in a motion adaptive deinterlacer (MAD) during a change from one mode of operation to another mode of operation. These modes of operation may comprise a hard start operation, a normal mode of operation, a force spatial operation for motion detection, and a flush operation that may occur when the video system is either being shut down or the video source is switched. U.S. patent application Ser. No. 10/945,729 filed on Sep. 21, 2004 entitled "Method and System for Control of a Multi-Field Deinterlacer Including Providing Visually Pleasing Start-Up and Shot-Down," discloses exemplary modes of operation in a MAD which may be utilized in connection with the present invention. Accordingly, U.S. patent application Ser. No. 10/945,729 is hereby incorporated herein by reference in its entirety.

Another example of network element modification or programming may comprise the instructional changes that may take place in the operation of an MPEG decoder and an MPEG video display. The decoding operation in the MPEG decoder may provide a triggering event that indicates to the RDMA controller 204 and to the processor 206 that the current set of RUL instructions utilized by the MPEG video display may need to be updated or modified to address decoding errors associated with the received stream of encoded video fields or video frames. The MPEG video display's mode of operation may therefore change in accordance with the results obtained by the MPEG video decoder.

Figure 4:
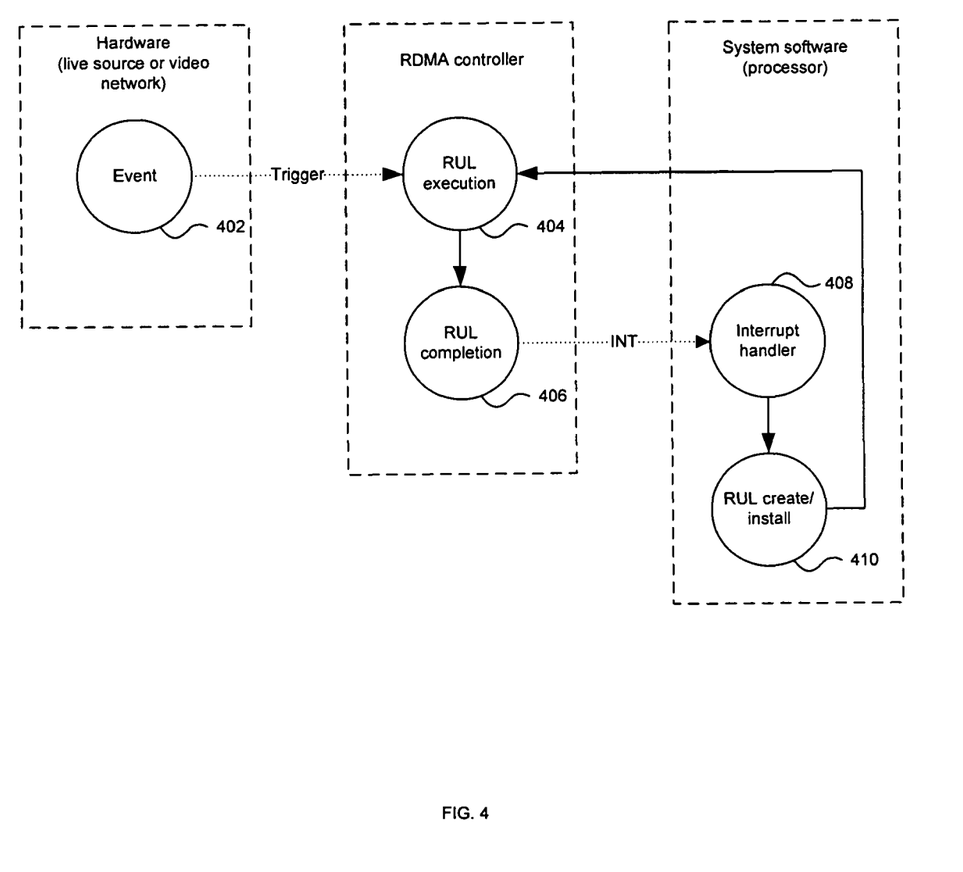
FIG. 4 illustrates a block diagram of an exemplary RDMA controller and processor operation during a network element programming sequence, in accordance with an embodiment of the present invention.

FIG. 4 illustrates a block diagram of an exemplary RDMA controller and processor operation during a network element programming sequence, in accordance with an embodiment of the present invention. Referring to FIG. 4, a hardware originated event 402 occurs and produces a triggering signal to the RDMA controller 204 from FIG. 2. The RUL execution 404 may be initiated by the triggering event and may be controlled by the RDMA controller 204. The RUL completion 406 may be initiated by the completed execution of the RUL execution 404 and may generate an interrupt signal to the system software executing on the processor 206 in FIG. 2. The time between the start of the RUL execution 404 and the end of the RUL completion 406 is very short. The interrupt or exception signal generated but the RUL completion 406 initiates an interrupt handler 408 to be executed by the system software. The interrupt handler 408 may determine a set of new instructions that will modify the mode of operation in the programmable network elements 202 and may provide those new instructions to the RUL in the memory 208. The interrupt handler 408 may consider state information and/or the source of the triggering event in determining the new instructions. In another embodiment of the invention, the interrupt signal may be provided by, for example, a test device or test software application and the interrupt handler 408 may be adapted to consider additional information in making its determination of the new instructions for the RUL. The RUL create/install 410 may be initiated upon the completion of the interrupt handler 408 and may complete the network element programming sequence by placing the new instructions into the RUL and installing the updated or modified RUL in the memory 208 so that it is ready for the next time the RUL execution 404 is called by a triggering signal. In the case where the updated RUL is not installed prior to the occurrence of a next triggering event, the set of instructions in the current RUL may be used by the RUL execution 404.

Figure 5:
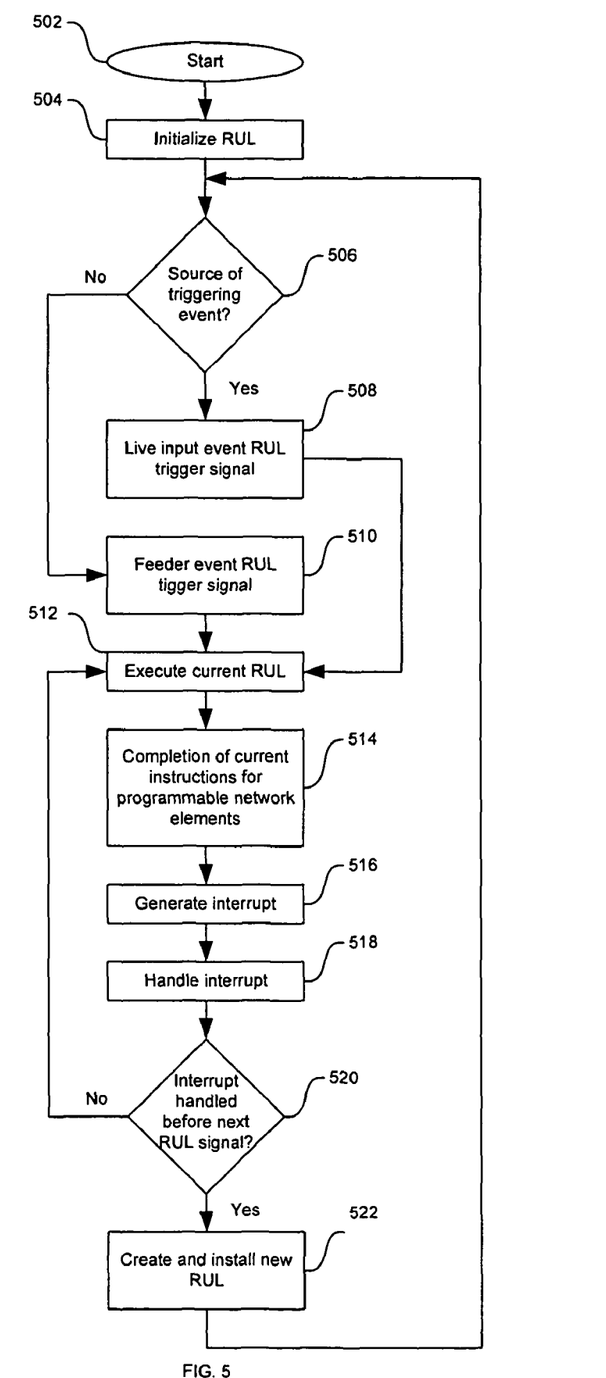
FIG. 5 illustrates a flow diagram of an exemplary network element programming sequence, in accordance with an embodiment of the present invention.

FIG. 5 illustrates a flow diagram of an exemplary network element programming sequence, in accordance with an embodiment of the present invention. Referring to FIG. 5, after start step 502, in step 504, the RUL in the memory 208 may be initialized so that all the programmable network elements 202 in FIG. 2 may have a starting mode of operation or data processing function. In step 506, the programming and control system 200 in FIG. 2 may determine whether the originator of the triggering event is a live input source or a video feeder. When the triggering event originated from a live input source, then a live input event RUL trigger signal is received by the RMDA controller 204 in step 508. When the triggering event originated from a video feeder, then a video feeder event RUL trigger signal is received by the RMDA controller 204 in step 510.

In step 512, the RDMA controller 204 executes the current instructions in the RUL in accordance with the source of the triggering signal. In step 514, the current instructions in the RUL are completed for each of the programmable network elements 202. In step 516, the completion of the current instructions in the RUL generates an interrupt signal to the system software. In step 518, the interrupt handler 408 in FIG. 4 is initiated to determine any new instructions or any updates to current instructions that may be needed in the RUL. In step 520, the programming and control system 200 determines whether a hardware triggering event has occurred before the interrupt handler 408 has completed its task. When the interrupt handler 408 has not completed its task before a new event occurs, then the RDMA controller 204 may utilize the current RUL instructions. When the interrupt handler 408 has completed its task before a new event occurs, then the system software in the processor 206 may create and install a new RUL with its new and updated instructions in the memory 208. The sequence repeats itself for every field or frame generated event.

This programming system and method for a video network may provide greater flexibility in the modification of the modes of operation of network elements in a video system by achieving minimal increases in hardware while also providing a simpler interface for the system software to control network element state information.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video signal processing, the method comprising:
   in an integrated circuit comprising a plurality of network elements:
   triggering the execution of at least one current instruction from a register update list;
   modifying a mode of operation of at least one of said plurality of network elements based on said at least one current instruction, wherein said plurality of network elements are operable to perform one or more video processing functions;
   updating at least one new instruction in said register update list;
   generating an interrupt to initiate generation of said at least one new instruction;
   handling the interrupt;
   updating said at least one new instruction in said register update list when an interrupt handler has completed; and
   determining whether a hardware triggering event has occurred before the interrupt handler has completed the updating, and responsive to determining the hardware triggering event has occurred, executing the at least one current instruction, otherwise responsive to determining the hardware triggering event has not occurred, continuing the updating.

2. The method according to claim 1, comprising triggering the execution of said at least one current instruction when a start-of-field signal is received from a live input source.

3. The method according to claim 1, comprising triggering the execution of said at least one current instruction when an end-of-frame signal is received from a last of said at least one of said plurality of network elements.

4. The method according to claim 1, comprising triggering the execution of said at least one current instruction based on whether a video field is a top field originated video field or a bottom field originated video field.

5. The method according to claim 1, comprising generating said at least one new instruction to be updated in said register update list.

6. A machine-readable storage having stored thereon, a computer program having at least one code section for video signal processing, the at least one code section being executable by a machine for causing the machine to perform steps comprising:
   in an integrated circuit comprising a plurality of network elements:
   triggering the execution of at least one current instruction from a register update list;
   modifying a mode of operation of at least one of said plurality of network elements based on said at least one current instruction, wherein said plurality of network elements are operable to perform one or more video processing functions;
   updating at least one new instruction in said register update list;
   generating an interrupt to initiate generation of said at least one new instruction;
   handling the interrupt;
   updating said at least one new instruction in said register update list when an interrupt handler has completed; and
   determining whether a hardware triggering event has occurred before the interrupt handler has completed the updating, and responsive to determining the hardware triggering event has occurred, executing the at least one current instruction, otherwise responsive to determining the hardware triggering event has not occurred, continuing the updating.

7. The machine-readable storage according to claim 6, wherein said at least one code section comprises code for triggering the execution of said at least one current instruction when a start-of-field signal is received from a live input source.

8. The machine-readable storage according to claim 6, wherein said at least one code section comprises code for triggering the execution of said at least one current instruction when an end-of-frame signal is received from a last of said at least one of said plurality of network elements.

9. The machine-readable storage according to claim 6, wherein said at least one code section comprises code for triggering the execution of said at least one current instruction based on whether a video field is a top field originated video field or a bottom field originated video field.

10. The machine-readable storage according to claim 6, wherein said at least one code section comprises code for generating said at least one new instruction to be updated in said register update list.

11. A system for video signal processing, the system comprising:
    in a single integrated circuit comprising a plurality of network elements that are selectively interconnected, said plurality of network elements comprising an RDMA controller and at least one processor, said plurality of network elements being operable to perform one or more video processing functions, wherein at least one of said plurality of network elements is configured to trigger execution of at least one current instruction from a register update list;
    wherein said RDMA controller is configured to modify a mode of operation of at least one of said plurality of network elements based on said at least one current instruction and generate an interrupt to initiate generation of said at least one new instruction; and
    wherein said at least one processor is configured to update said at least one new instruction in said register update list, handle the interrupt, and update said at least one new instruction in said register update list when an interrupt handler of the processor has completed, wherein the RDMA controller is further configured to determine whether a hardware triggering event has occurred before the interrupt handler has completed the updating, and responsive to determining the hardware triggering event has occurred, execute the at least one current instruction, otherwise responsive to determining the hardware triggering event has not occurred, allow continuing by the processor of the updating.

12. The system according to claim 11, wherein said at least one of said plurality of network elements triggers the execution of said at least one current instruction when a start-of-field signal is received from a live input source.

13. The system according to claim 11, wherein said at least one of said plurality of network elements triggers the execution of said at least one current instruction when an end-of-frame signal is received from a last of said at least one of said plurality of network elements.

14. The system according to claim 11, wherein said at least one of said plurality of network elements triggers the execution of said at least one current instruction based on whether a video field is a top field originated video field or a bottom field originated video field.

15. The system according to claim 11, wherein said at least one processor generates said at least one new instruction to be updated in said register update list.

* * * * *